Nov. 20, 1951 W. H. BALTIN ET AL 2,575,742

DEVICE FOR COPYING RECORDS ON A PROPORTIONAL SCALE

Filed May 13, 1947 3 Sheets-Sheet 1

INVENTORS
WILLIAM H. BALTIN
RALPH R. BATCHER
BY Des Jardins & Hampton
THEIR ATTORNEYS Nov. 20, 1951 W. H. BALTIN ET AL 2,575,742

DEVICE FOR COPYING RECORDS ON A PROPORTIONAL SCALE

Filed May 13, 1947 3 Sheets-Sheet 2

INVENTORS
WILLIAM H. BALTIN
RALPH R. BATCHER
BY Des Jardins & Dampton
THEIR ATTORNEYS Nov. 20, 1951 W. H. BALTIN ET AL 2,575,742

DEVICE FOR COPYING RECORDS ON A PROPORTIONAL SCALE

Filed May 13, 1947 3 Sheets-Sheet 3

INVENTORS
WILLIAM H. BALTIN
RALPH R. BATCHER
BY
Des Jardins & Compton
THEIR ATTORNEYS Patented Nov. 20, 1951

2,575,742

UNITED STATES PATENT OFFICE 2,575,742

DEVICE FOR COPYING RECORDS ON A PROPORTIONAL SCALE

William H. Baltin, New Brunswick, N. J., and Ralph R. Batcher, Douglaston, N. Y., assignors to Transcontinental Television, Inc., New Brunswick, N. J., a corporation of New Jersey Application May 13, 1947, Serial No. 747,877

9 Claims. (Cl. 178—6.6)

This invention relates to a device for copying records on a proportional scale, and more particularly pertains to such a device whereby characters may be reproduced in the same size, or in a larger or smaller size, as compared with the original, by a novel combination of electro-mechanical elements.

Although the device will find its main use, at present, in the enlargement of ordinary typewritten matter appearing on record tape, so that it may be read at considerable distances, as for instance across a large room, it is also adapted for use in reproducing other types of printing or writing wherever there is a contrast between the characters and the surface of the record material upon which they exist.

Generally, the device includes a scanning station across which an original record material is moved, a reproducing station across which a receiving record material is moved at a selected speed which is fixed proportionally to the speed of movement of the original record material, a light-beam scanning means which causes a beam of light to make recurrent cyclic excursions of a determined period and sweep across the original record material, transversely to its direction of travel, a reproducing marking means caused to make a marking excursion across the receiving material, at the reproducing station, each time the light beam makes an excursion and for the same period but with a selected differential excursion length fixed to scale with the proportional speeds of the two tapes, and a photo-electric means to generate electric signals received from the light reflected from the original record material, the electric signals being delivered to the marking means to cause the characters appearing on the original record material to be reproduced on the receiving record material on a scale proportional to the relative speeds of the record materials and the corresponding relative excursions of the scanning beam and marking elements. The novel result is obtained by mechanically coupling the movement of the scanning means and the reproducing means, together with cooperating means for moving the two record materials at their proper proportional speeds.

While the embodiments of the invention as disclosed herein utilize record material in the form of tape, it will be appreciated that the principle of operation is equally applicable to sheets or wide rolls of paper. The tapes shown in the disclosed embodiments of the invention have electrically sensitive coatings thereon which respond, by marking, to electric current passed therethrough, such coatings for paper and paper so treated with electrically sensitive material to make marks being well known commercially, one of such papers being sold under the name of "Tela-Deltos."

The device as shown in the disclosed embodiment is particularly adapted to reproduce contextural matter appearing linearly on tape such as issues from stock ticker machines or news issuing telegraph printers, and since such tapes and the characters thereon are ordinarily small, the ordinary use of the novel device of this invention would be in the field of enlarging the size of the original data, although the opposite effect may be had by proper adjustment of the parts. It will be understood, from an examination of this disclosure, that rapid and cheap reproduction enlargements of the typewritten matter may be made, and that the device has great utility where speed of making an enlarged reproduction is essential, such as, for instance, in the preparation of script material for use in radio or television work, where the script must be placed at a distance from the reader.

A number of copies of the original material may be reproduced at one time by the use of multiple reproducer units, and the invention thus serves the additional function of providing a device for making multiple enlarged or reduced reproductions at the same time.

It further will be obvious, from what will be described, that more than one reproduction unit can be energized by these character bearing electric signals derived from the original material, and that of such units, one may be an enlarger and the other a reducer. If a number of reproducer units scaled to the original size of the characters are used, then multiple facsimile copies of the original may be reproduced.

Therefore, the principal object of our invention is to provide a means for reproducing recorded data on a proportional scale by the use of a moving light beam scanning device mechanically coupled to and moving a reproducer proportionally.

Another object of the invention is to provide such a record reproducing means wherein the light beam reflected from the original record differentially controls the reproducer unit to make reproducing marks.

Another object of the invention is to provide such a record reproducing means with a means for moving an original record material and means for moving a receiving record material at determined proportional speeds.

Another object of the invention is to provide such a record reproducer wherein the reflected light beam generates electric signals to actuate the reproducer to mark the receiving record.

Another object of the invention is to provide such a record reproducer which marks electro-sensitive record material.

Another object of the invention is to provide such a record reproducer for use with tape record materials.

Another object of the invention is to provide such a record reproducer which enlarges the size of the recorded data.

Another object of the invention is to provide such a record reproducer which reduces the size of the recorded data.

Another object of the invention is to provide such a device wherein the light beam scanning control means is moved by the same means that moves the reproducing marking means.

Another object of the invention is to provide such a device in which the scanning control means and reproducer marking means move in a rotary fashion.

Another object of the invention is to provide such a device in which the scanning control means and the reproducer marking means oscillate back and forth through the same arc.

Another object of the invention is to provide such a reproducer wherein the receiving and reproducing elements are moved in recurring cycles together.

Further objects, and objects relating to details and economies of operation, will definitely appear from the detailed description to follow. In one instance, the objects of our invention have been accomplished by the devices and means set forth in the following specification. The invention is clearly defined and pointed out in the appended claims. Structures constituting the preferred embodiment of the invention, are illustrated in the accompanying drawings, forming a part of this specification, in which:

Referring to the drawings wherein corresponding parts have been given the same reference numerals, we show in Figs. 1 to 7, a preferred embodiment of our invention, and in Fig. 8 we show a modified form of our invention.

Figure 1:
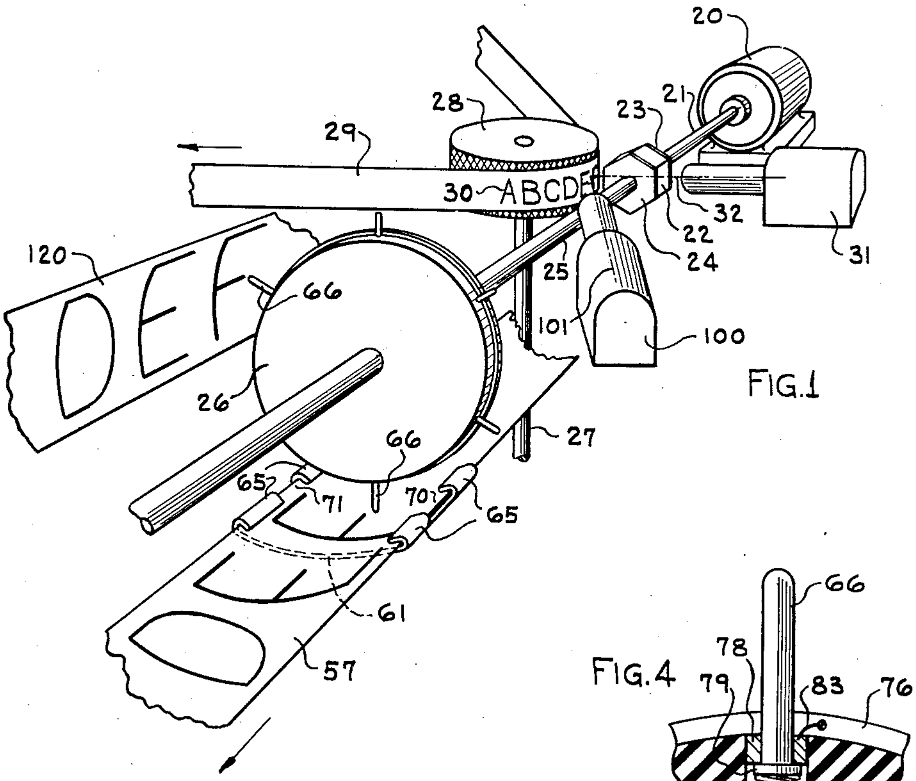
Fig. 1 is a perspective view showing the invention in an embodiment utilizing a rotating prism scanning control means and a rotating marking means mounted on a common drive shaft.
Figures 5, 6:
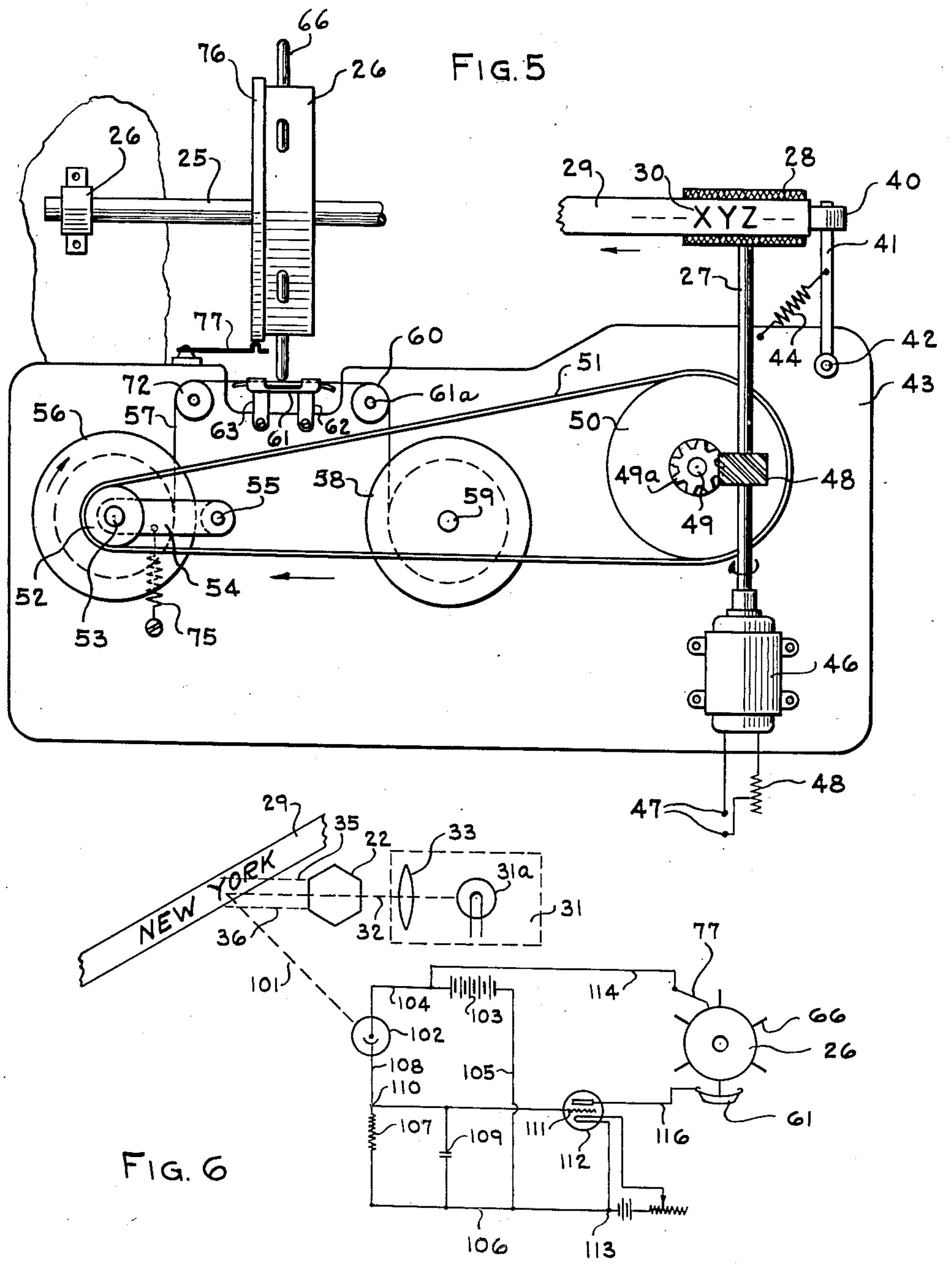
Fig. 5 is an elevation of part of the substance of Fig. 1 showing the record material moving means.
Fig. 6 is a diagrammatic showing of the optical system and an amplifying system for producing the electric marking signals to be used in connection with the device shown in Figs. 1 to 5.
Figure 7:
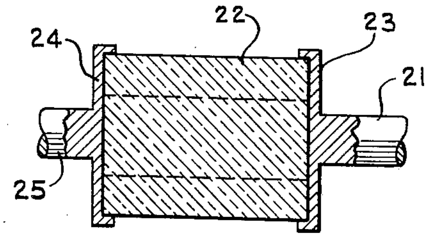
Fig. 7 is a broken section through the axis of rotation of the prism shown in Fig. 1 and shows the mounting thereof so as to form a part of the scanning drive shaft.

Referring to Fig. 1, we provide a motor 20 which is given a selected constant driving speed to drive the shaft element 21, having mounted thereon a hexagonal light refracting right prism 22, held in a flange 23 (see Fig. 7). On the other end of the prism is a flange 24 mounted on a continuation element 25 of the scanning shaft, which has secured, therebeyond, a disc 26 of electrically non-conducting material. The left-end of the shaft 25 can be mounted in a bearing 26*a* (see Fig. 5) for support. A shaft 27 (Figs. 1 and 5) has secured to its upper end, a knurled drum 28, carrying in contact with its circumferential periphery, an original record tape 29, bearing characters 30, which are to be reproduced. Rotation of shaft 27 will drive the tape past the prism 22. Tape 29 can be held on supply and take-up spools as in any of the well known devices dealing with record tape. A lamp housing 31 (Fig. 1) is arranged to direct a light beam 32, emanating from an electric lamp 31*a* (see Fig. 6), located within the lamp housing 31, and directed by a lens 33, normally onto the sides of the prism 22 and directed at its axis of rotation as determined by shaft elements 21 and 25, so that it will impinge, after traversing the prism, on the tape 29 and characters 30 carried thereon past the prism. As the shaft 21 and prism 22 rotate, the emergent beam from the prism 22 will make a vertical sweep across the tape 29 each time a new prism face is presented to and passes the entering beam, because of the refraction of the prism. Inasmuch as opposite sides of the prism are parallel, the emergent beam will be displaced upwardly or downwardly, depending on the sense of rotation of shaft 21, parallel to the entering beam 32, once for each passing prism face. The size and refractive index of the prism 22 is chosen so that the movement of the emergent beam will be sufficient to carry it completely across the characters on the tape. Referring to Fig. 6, the upper limit of motion of the emergent beam is shown by the dotted line 35, and the lower limit of motion of the emergent beam is shown by the dotted line 36, all of the showing of Fig. 6 being in diagrammatic form, and not necessarily to scale, to more easily bring out the relationship of the parts.

Figures 3, 4:
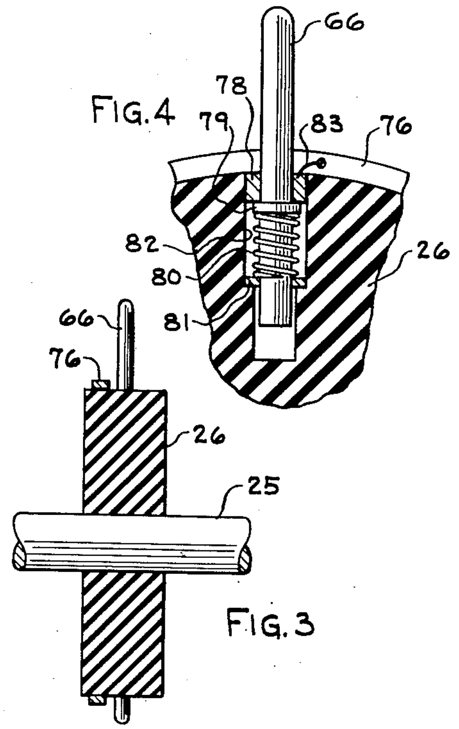
Fig. 3 is a section through Fig. 2 on the line 3—3.
Fig. 4 is a sectional detail showing one of the marking brushes and its mounting in the disc.
Figure 2:
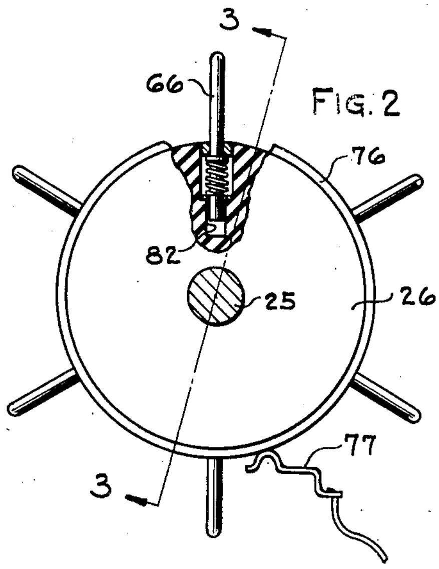
Fig. 2 is an elevation of the reproducing disc and brushes of Fig. 1, partly broken away to show details of construction.

Referring to Fig. 5, there is shown a record material driving means which correlates the movement of the tape bearing the original record with the movement of the tape on which the copy or reproduction is to be made. An idler roller 40, rotatably mounted on the end of lever 41, pivotally mounted at 42 on frame plate 43, is held against the tape 29, by spring 44, so that the speed of rotation of drum 28 will determine accurately the transverse movement of the tape 29 past the beam emerging from the prism. The point at which the beam traverses the original tape shall be termed the scanning station. Mounted on frame 43 (Fig. 5) is a motor 46, supplied with power from terminals 47, through a speed control device 48, whereby the speed of the motor 46 may be selectively adjusted for the purpose of determining the speed with which the tape 29 passes the scanning station. Motor 46 supports and drives shaft 27, and on shaft 27 is mounted gear 48*a* which drives gear 49*a* secured on a shaft 49 journaled in the frame 43. Also secured on shaft 49 is a belt pulley 50 driving a belt 51 passing over a pulley 52 secured to shaft 53 journaled in lever 54 which is pivoted by pivot 55 to the frame plate 43. Also mounted securely on shaft 53 is a spool 56 which is rotated in the direction of the arrow to take up tape 57, on which the record has been reproduced, said tape 57 being supplied from spool 58, rotatably journaled on stub shaft 59 secured in the frame plate 43. Tape 57, as it leaves supply spool 58, rides over an idling drum 60 rotatably mounted on stub shaft 61*a* held in the frame plate 43, and then rides over an electrically conductive table 61 secured to frame plate 43 by posts 62 and 63. The tape 57 as it passes over table 61 is made to assume a curve by reason of ears 65 and the curved contour of table 61, as seen in Fig. 1. The curvature of table 61 is concentric with the axis of rotation of shaft 25, and brushes, like brush 66, resiliently mounted in the disc 26 are made of a length so that they will brush the tape 57 as the disc rotates, and clearance slots 70 and 71 are provided in the table for the approach and departure of the brushes as they pass over the tape. The line of movement of these brushes constitutes the recording or copying station of the apparatus. It will be understood, from reference to Fig. 5, that, after the tape leaves the table 61, it passes over another idler drum 72, mounted similarly to drum 60, and from thence to the take-up spool 56. Spring 75 pulling down on lever 54 assures the proper tension of the driving belt 51 at all times. Referring to Figs. 2, 3, 4 and 5, disc 26 is equipped with a circumferential, electrically conducting, ring 76 upon which rides a brush 77 (Figs. 5 and 6) secured to an insulator on frame 43. Referring to Fig. 4, each of the brush members 66 is retained in a metal collar 78, by means of a flange 79, against which collar the flange is held by a spring 80 whose other end bears against a washer 81, held within a brush receiving aperture 82 which is positioned radially in the disc 26. By this construction each brush member 66 is resiliently movable inwardly, at all times, and is in electric contact relation with collar 78. Each collar 78 is connected by a wire 83 to conducting ring 76. Each of the radially mounted brushes 66, thus, is connected to the electric conducting ring 76 and, consequently, whenever such conducting ring 76 is given an electric energization, all the brushes 66 are given the same energization. There are six brushes mounted around the disc, at 60° angular intervals corresponding to the six sides of the prism 22.

By selecting the ratio between gear 48 and gear 49*a*, and by proper choice of the sizes of belt pulleys 50 and 52, and the sizes of spools 56 and 58, a proper correlation may be made between the transverse speed of tape 57 across the recording station and the transverse movement of the tape 29 across the scanning station. In the preferred embodiment shown, as for instance, in Fig. 1 it is contemplated that the speed of movement of receiving tape 57 shall be three or four times as great as that of the speed of movement of original tape 29, and that the effective movement of one of the brushes 66 across tape 57 shall be three or four times the height of the characters 30 on tape 29, and that is arranged by properly selecting the distance between the axis of shaft 25 and tape 57.

Inasmuch as a 60° rotation of the prism 22 results in one vertical sweep of a character at the scanning station, and that a similar 60° rotation is given to the disc 26, it is apparent that will cause one of the brushes 66 to sweep across the tape 67 and, if the brush 66 is electrically energized according to the reflection or absorption of the light beam 32 by the characters 30 on tape 29, an electrical effect can be produced on the tape 57 corresponding to the portion of the character scanned by the light beam in that particular sweep. There has, therefore, been provided, to cooperate with the brushes, the electrically sensitive tape 57, which, as has been before indicated can be any of the various commercially available kinds of tape which respond to the passage of electrical current therethrough by leaving a mark.

Diagrammatically shown, in Fig. 1, is a photoelectric cell and circuit, housed in an enclosure 100, which is adapted to receive the reflected light beam 101 from the tape 29. Referring now to Fig. 6, wherein the electro-optical system is shown diagrammatically, reflected light beam 101 is arranged to fall upon photo-electric cell 102 which is energized by battery 103, by way of conductor 104 leading to the anode of the photoelectric cell, and by way of conductors 105, 106, resistor 107 and conductor 108 connected to the cathode of the photo-electric cell. Resistor 107 is shunted by a capacitor 109. The changes in potential of point 110, as current fluctuations occur in the photo-electric cell, are impressed on the grid 111 of amplifier tube 112 which receives cathode potential from point 113, connected to the negative terminal of battery 103 and which receives anode potential through conductor 114, sliding brush 77 and brushes 66 on disc 26, and from there through tape 57 and electrically conducting table 61 by way of conductor 116. It will be obvious that the photo-cell 102 can be so connected in the circuit as to be normally non-conducting so that when light falls thereon it will cause current flow in the cell and a change in the potential of point 110 towards the positive, with a consequent flow of current caused through tube 112 to make a mark upon the tape 57. It will also be understood that the photo-cell can be reversely arranged in the circuit so that the grid 111 of tube 112 can be made more negative upon the receipt of light from the reflected light beam by the photo-cell so as to stop a normal flow of current through tube 112. The characters on the original tape, therefore, can be reproduced in either a negative or positive fashion upon the tape 57.

As many duplicate copies may be made at the same time as there are brushes on the disc 26 by supplying a tape and table at each 60° interval. Indeed, as many discs may be used as is desired to further expand the use of the device.

It will be obvious that the speed of the driving shaft 21, prism 22 and shaft 25, as a unit, as compared to the speed of the tape 57, determines the definition of the reproduced characters by determining the number of times a brush 66 crosses the path of tape 57 per unit of transverse movement of tape 57.

It will be understood that the degree of enlargement is a function of the distance of tape 57 from the axis of shaft 25, of the refractive index of prism 22, and of the size of the prism 22, the several values being so chosen as to give the proper ratio of vertical height between the original characters and the reproduced characters. It will also be understood, from what has been said that the ratio of transverse movement of the original tape 29 to that of the tape 57, on which the matter is copied, is a function of the gearing ratio chosen, and such should be proportioned, ordinarily, so that the change in the width of the characters copied is proportional to the change in the height of the characters copied, although such need not be adhered to if distortion in one or the other direction is wanted.

Figure 8:
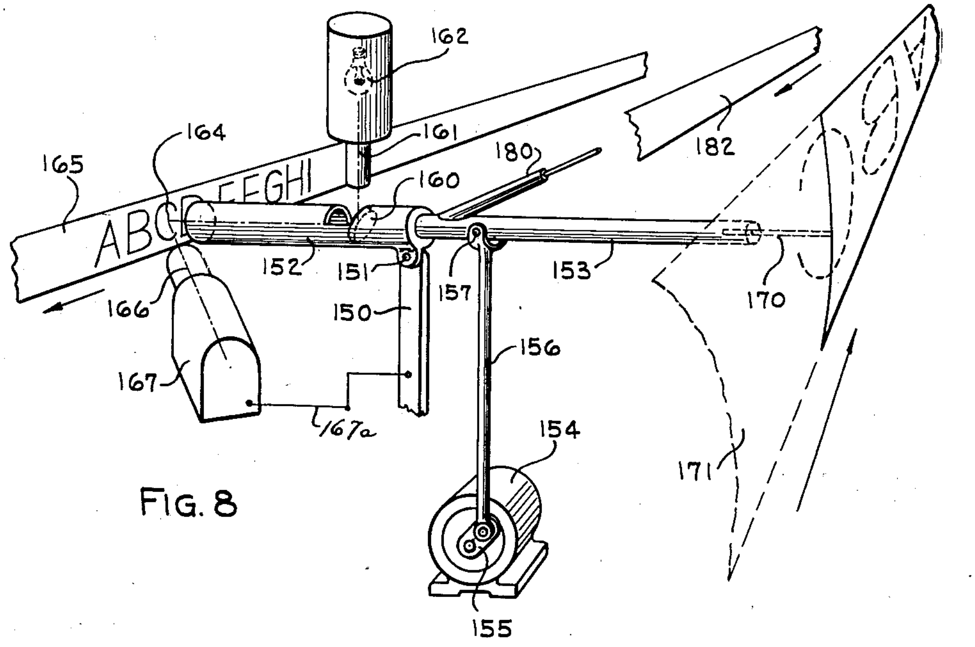
Fig. 8 is a modified form of our invention showing an oscillating lever type of scanning and marking means.

A modified form of the invention is shown in Fig. 8, wherein an upright standard 150 has, pivoted at 151, an oscillatable member having a short tubular arm 152, on one end, and a longer arm 153 on the other end, the two being balanced as to weight so as to give freedom of oscillation about the pivot 151. A motor 154 having an eccentric drive arm 155 pivoted to a link 156 whose other end is pivoted at 157 to arm 153, causes cyclic oscillation of the member comprising arms 152 and 153. Tubular arm 152 has disposed therein, at an angle, a mirror 160 adapted to reflect a light beam 161 issuing from a light source 162 through the center of the hollow tube toward its outer end to impinge, as at 164, on a tape 165 being transported past the end of arm 152 in the direction of the arrow. As the motor 154 oscillates the member composed of arms 152 and 153, the light beam will sweep up and down across the tape 165, as the tape is being transported, and, whatever characters are on the tape 164, will cause a variation in the reflected beam 166 from the tape in the same manner as described in connection with the form of the invention shown in Fig. 6. Box 167 represents the photo-cell and amplifying system which is shown in Fig. 6 and the modified electric signals issuing therefrom are conveyed by conductor 167$a$ to standard 150, which is made of electrically conductive material, through pivot 151, arm 153 and brush 170 which is resiliently mounted in the end for axial movement of arm 153 therein, all of said parts 151, 153 and 170 conducting the modified electrical potential so as to mark upon the tape 171 the same characters, either in positive or negative form, as are on the tape 165, in the manner mentioned in regard to the preferred embodiment. The entire electrical system has not been shown for Fig. 8 in that a return circuit has not been shown from the back of the tape 171, but the same kind of table 61 as shown in Fig. 6 may be used to hold the tape 171 as it is being transported past the brush 170. Nor has the tape transporting means been shown, as it may be adapted from that shown for the preferred form of the invention. It will be seen that by selective adjustment of the relative speeds of the tapes 165 and 171 in the direction of the arrows as related to the relative distances of tapes 165 and 171 from the pivot point 151 there will result a consequent reproduction of the characters in a different size according said proportional measurements, the increase of lengths of arm 153 over that of 152 being evidenced in the vertical component of the copy and the relative speeds of the tape being evidenced in the horizontal component of the copy. For the purpose of showing the possibilities of using our device for a reduction in the size of characters to be copied, we show a stub arm 180 located on the same side of the pivot point 157 as is the arm 152 and extending laterally therefrom, said stub arm 180 having a very small movement of oscillation in comparison with the outer end of arm 152 and therefore being able to copy on a tape, such as tape 182 passing thereby, the same characters as are copied on the tape 171 except on a much smaller vertical scale than the original. Tape 182 may be transported at a speed to make the copy have the desired horizontal size.

From what has been disclosed, it will be apparent that the pickup scanning means and the copying or recording means, in each form of our invention, are operated cyclically together to bring about the reproducing or copying action, and that the difference in size, in one dimension, between the original characters and the copied characters, is attributed to the difference in effective sweep movement, in length, of the scanning beam as compared to the effective movement of the marking brush during similar portions of a cycle. By varying the difference of amplitude of such movements in the reproducing means a difference in the size of the copied characters in one dimension can be obtained, or, by having the effective sweep amplitude of both the pickup and the reproducing means the same, the size of the copy characters in one dimension may be made the same as the original. By correlating the speed of the record material on which the original characters are impressed with the speed of the record material on which the copying is to be done the other dimension may be controlled, so the shape of the characters of the reproduced copy may be made similar to those of the original copy, or, if it be desired to have the copied characters distorted as compared with the original characters, then the tape speed may be adjusted to suit that purpose.

We are aware that the device shown herein may be varied considerably without departing from the spirit of our invention and, therefore, we claim our invention broadly as indicated by the appended claims.

Having thus described our invention, what we claim as new and useful and desire to secure by Letters Patent, is:

1. A device for making a record reproduction from an original record, including, in combination, a scanning device including a stationary light source generating a fixed light beam, and light deflecting means to move the beam cyclically in scanning movements across the original record; means actuated by the beam as affected by the record to generate corresponding electric signals; and reproducing means controlled to record according to the electric signals, said light deflecting means and said reproducing means being mechanically coupled so that one moves synchronously with the other but with a relative difference in amplitude of the scanning and reproducing movement as determined by the mechanical coupling.

2. A device for making a record reproduction from an original record material, having data thereon having different light reflecting characteristics than the record material, including, in combination, a stationary light source creating a fixed beam of light; a cyclically operable light deflecting means to project the light beam onto the record material in a scanning movement, to scan the original record; means actuated by the light of the beam as reflected from the record material to generate electric signals corresponding to the scanned data; and a cyclically moving reproducing means mechanically coupled to the scanning means, said reproducing means being energized and de-energized by the electric signals to reproduce the scanned data, the coupling of said scanning moving means and the reproducing means being such as to cause them to have the same cyclic timing and to cause the effective reproducing movement to be of relatively different amplitude than the effective scanning movement by a fixed factor.

3. A device for making a record reproduction from an original data bearing record, including, in combination, means to move the original record by a scanning point; means to scan the record transversely to the line of movement of the record, including a stationary light source for producing a fixed beam of light, and a cyclically operable light deflecting means for causing the beam to be swept periodically across the original record; means to collect the reflected light from the record material as modified by data thereon; means responsive to the reflected light to generate electric signals corresponding to the data on the record material as carried by the modifications in said reflected light beam; a moving reproducing means moved by mechanical coupling with the light beam deflector so the two move synchronously together, said reproducing means being controlled to record according to the generated electric signals, and said moving reproducing means having a transverse scribing movement of an amplitude different from that of the deflector as determined by the mechanical coupling; and means for moving a record on which the reproduction is to be made by the reproducing means normal to the transverse scribing movement, whereby the original data is reproduced in a size determined by the ratio of the amplitude of movement of the deflector, to the amplitude of movement of the scribing means, and according to the ratio of the speed of the original record movement to the speed of the reproduction record movement.

4. A device for making an enlarged reproduction of an original record bearing light reflecting data, including, in combination, means to move the original record by a scanning station; a stationary light beam source for producing a fixed beam of light; light deflecting means movable to cause the light beam to scan the record material in strokes transversely to its line of movement as it passes the scanning station; means to move record material on which the reproduction is to be made by a reproducing station; recording means movable in strokes across the record material at the recording station, transversely to the line of travel of the record material, said recording means being energizable by electric signals to record on said record material; a member common to the movable scanning means and to the movable recording means, to drive them synchronously together so each effective scanning stroke movement is but a fraction of each reproducing stroke movement, in length; means actuated by the reflected light from the original record to generate electric signals to correspond to the recorded data; and means connecting the moving means for the original record material to the means to move the reproduction record material so as to make the movement of the scanned record the aforementioned fraction of the movement of the reproduced record.

5. In a reproducer of characters defined by their light absorbing characteristics as they appear on an original record material, which characters are to appear on the receiving record material in a different size, the combination of a source of light forming a scanning beam; a cyclically moving scanning beam control means onto which the light beam impinges and thereby is caused to be projected across the original record in a determined scanning sweep path occurring cyclically by reason of the cyclic movement of the control means; a record transporting means by which the original record is caused to move transversely across the sweep path of the beam at a determined speed, so that the characters on the record material are scanned by the beam during a certain determined period of the sweep, the light beam reflected from said record material being differentially affected by the light absorbing characteristics of the characters; a receiving record transporting means which moves the receiving record by a reproducing station at a speed which is a determined multiple of the transporting speed of the original record; a recording means moved transversely across the receiving record, at the reproducing station; a mechanical coupling between said scanning beam control means and said recording means for causing the recording means to move in synchronism with the cyclic movement of the scanning beam control means and for causing the amplitude of movement of said recording means to be different from that of said scanning beam control means, said recording means being rendered effective and ineffective to produce a mark according to electric signals received by it; and means responsive to the reflected light beam and coupled to the reproducing means to create electric signals to actuate the reproducing means to cause it to mark data corresponding to that scanned.

6. In a reproducer of characters defined by their light absorbing characteristics as they appear on an original tape record material which characters are to appear on a receiving tape record material in a different size, the combination of, a source of light forming a scanning beam; a cyclically moving scanning beam control means including an optical element fastened to a rotating shaft, onto which element the light beam impinges and there is caused to be projected in a scanning sweep occurring cyclically by reason of the cyclic movement of the control means as caused by the shaft's rotation; a record tape transporting means by which the original tape is caused to move at a determined speed transversely across the sweep path of the beam so that the characters on the record material are scanned by the beam during a certain determined effective period of the sweep and with a certain number of sweeps per unit distance the tape is transported, the light beam reflected from said characters being differentially affected by the light absorbing characteristics of the characters as compared with the bare tape; a receiving tape transporting means which moves a receiving record tape transversely by a reproducing station at a speed which is a determined multiple of the speed of the original tape; a recording means including brush elements moved across the receiving tape at the reproducing station, synchronously, to correspond with the cyclic movement of the scanning beam control means by reason of said recording means being moved by the same shaft that moves the optical means, said recording means being rendered effective and ineffective to produce a mark according to electric signals received by it, and the brushes on said recording means having an effective sweep path which is the determined multiple of the effective sweep path of the scanning beam; and means responsive to the reflected light beam and coupled to the reproducing means and its brush elements to create electric signals to actuate the reproducing means to cause it to mark data on the receiving tape corresponding to that scanned, but differing in size according to said determined multiple and with the same number of defining lines in each character scanned.

7. A device for making a record reproduction from an original record, including, in combination, means for moving an original record past a scanning station; a fixed source of light forming a stationary light beam, a cyclically operable light beam deflector movable, in respect to the light beam, transversely to the direction of the moving record for scanning one side of the original record and generating signals corresponding to the recorded data on the record; means actuated by the generated signals to generate corresponding electric signals; a reproducing means controlled by the electrical signals to record the data represented thereby; means for moving the light deflector scanning means and the reproducing means in the same arc; and a mechanical connection between the reproducing means and the deflector for moving them synchronously but with a relative difference in amplitude.

8. In a device for making a record reproduction from an original record, the combination of means to scan the original record and generate signals corresponding to the data recorded on the original record, said means including a light source for producing a stationary beam of light, an element for deflecting said beam and causing it to periodically sweep across the original record, and a light sensitive device controlled by said beam for producing electric signals corresponding to the data recorded on the original record; record material for receiving the data reproduced from the original record; reproducing means controlled by the electric signals produced by said light sensitive device for recording, on said record material, data corresponding to the data on the original record; a common member for supporting both said deflecting element and said reproducing means, said member being mounted for turning movement about a fixed axis; and means for giving said member cycles of operation about said axis so as to cause said reproducing means to move across said record material in synchronism with the movement of said beam across the original record.

9. The combination recited in claim 8 wherein said reproducing means is mounted on said member at such a distance from said axis as to cause the amplitude of movement of said reproducing means to be greater than that of said light beam whereby the data recorded on the record material will be of larger size than the data contained on the original record.

WILLIAM H. BALTIN.
RALPH R. BATCHER.

REFERENCES CITED

The following references are of record in the file of this patent:

UNITED STATES PATENTS

| Number | Name | Date |
|---|---|---|
| 1,719,392 | Cooley | July 2, 1929 |
| 1,923,208 | Howey | Aug. 22, 1933 |
| 2,002,393 | Freed | May 21, 1935 |
| 2,039,406 | Greensfelder | May 5, 1936 |
| 2,047,851 | Bennett | July 14, 1936 |
| 2,092,765 | Losier | Sept. 14, 1937 |
| 2,143,875 | Hansell | Jan. 17, 1939 |
| 2,179,002 | Washington, Jr. | Nov. 7, 1939 |
| 2,251,828 | Hammond, Jr. | Aug. 5, 1941 |
| 2,260,511 | Cooley | Sept. 28, 1941 |
| 2,287,413 | Bruce | June 23, 1942 |
| 2,312,328 | Finch | Mar. 2, 1943 |
| 2,340,317 | Finch | Feb. 1, 1944 |
| 2,370,160 | Hansell | Feb. 27, 1945 |